United States Patent [19]

Pinto

[11] 4,264,567
[45] Apr. 28, 1981

[54] METHOD FOR PRODUCING A HYDROGEN-CONTAINING GAS

[75] Inventor: Alwyn Pinto, Middlesbrough, England

[73] Assignee: Imperial Chemical Industries Limited, London, England

[21] Appl. No.: 51,408

[22] Filed: Jun. 25, 1979

[30] Foreign Application Priority Data

Jul. 7, 1978 [GB] United Kingdom ............... 29230/78

[51] Int. Cl.³ ........................... C01B 1/13; C01C 1/04
[52] U.S. Cl. .................................... 423/359; 252/373; 423/650
[58] Field of Search ............... 423/359, 360, 361, 650, 423/651, 652, 653, 654; 48/214 A, 197 R, 213, 215; 252/373, 374

[56] References Cited

U.S. PATENT DOCUMENTS

| | | | |
|---|---|---|---|
| 3,441,393 | 4/1969 | Finneran | 423/359 |
| 4,148,866 | 4/1979 | Becker | 423/359 |

FOREIGN PATENT DOCUMENTS

1280226 10/1968 Fed. Rep. of Germany .
1115100 5/1968 United Kingdom .

OTHER PUBLICATIONS

Olsen, "Unit Processes and Principles of Chemical Engineering", D. Van Nostrand Co., Inc. (1932), pp. 1–3.

*Primary Examiner*—O. R. Vertiz
*Assistant Examiner*—Wayne A. Langel
*Attorney, Agent, or Firm*—Cushman, Darby & Cushman

[57] ABSTRACT

In a process for producing a hydrogen containing gas by reacting steam with a feedstock to give a gas at a temperature of at least 350° C., generating high pressure steam by heat exchange with such a gas, letting down the steam in an expansion engine of the pass-out type and using engine exhaust steam as process feed, an improvement in energy economy is achieved by bringing the engine exhaust steam into heat exchange with water and contacting the resulting hot water with a gaseous or vaporised feed to the process. The steam exhausted from the engine is preferably at a pressure lower than that at which the steam-using process step is generated. The process is especially useful in ammonia production by way of steam hydrocarbon reforming at an unconventionally high pressure in the range 40–80 bar abs, followed by synthesis at a pressure not more than 50% higher.

8 Claims, 1 Drawing Figure

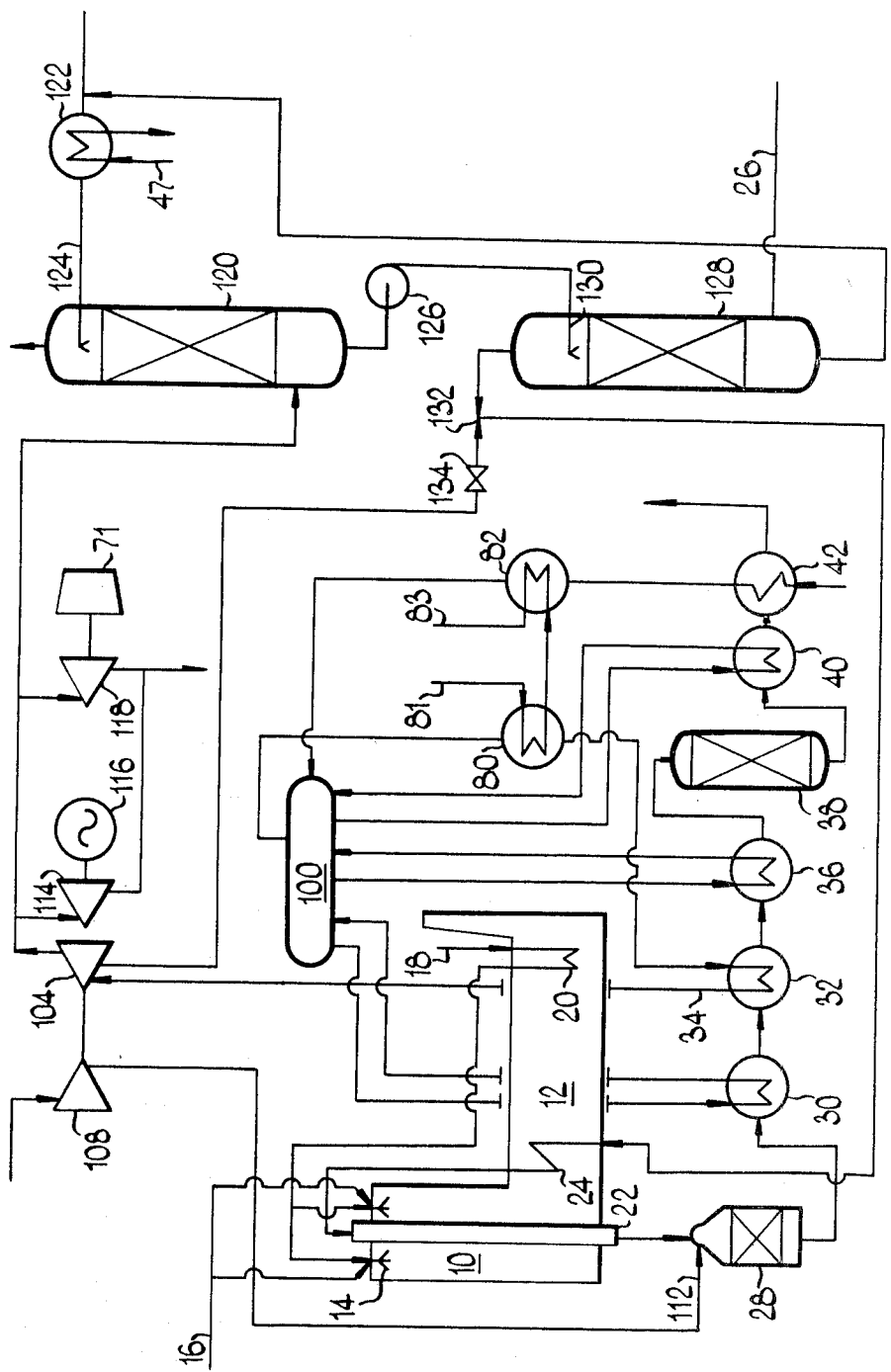

METHOD FOR PRODUCING A HYDROGEN-CONTAINING GAS

This invention relates to hydrogen and in particular to a process and apparatus for producing a hydrogen-containing gas.

In a widely used process for producing hydrogen or a hydrogen-containing synthesis gas, a carbonaceous feedstock which is carbon monoxide or a gaseous or volatilised hydrocarbon is reacted with steam over a catalyst at an outlet temperature of at least 350° C. and the resulting raw gas is cooled in heat exchange with water to produce steam. If the feedstock is a hydrocarbon the reaction with steam is endothermic and the reaction heat is provided by a combustion furnace, the flue gases of which can be heat-exchanged with water to produce steam instead of or in addition to the steam produced by cooling the raw gas. In the process of this kind described in U.S. Pat. No. 3,441,393 the steam is let down in an expansion engine driving a compressor for one or more of the gas streams in the process and the pressures of steam generation and at the engine outlet are chosen so that (a) the engine provides sufficient power and (b) the outlet steam can be fed to the reaction of the feedstock with steam.

We have realised that whereas the engine power available has been limited by the need to fix the engine outlet pressure at a level above the pressure at the inlet of the feedstock-steam reaction, this can be avoided by adding the steam in a different way. The engine-power limitation is more serious the higher the pressure at which the feedstock-steam reaction is to be operated and can lead to inefficient use of fuel especially in processes in which the raw gas is generated at so high a pressure that little if any compression is applied before (following the usual purification steps) it is used in synthesis, such as of ammonia or methanol. We have realised too that our new process can be used in the framework of gasification of carbonaceous feedstocks by partial oxidation.

According to the invention a process for producing a hydrogen-containing gas by reacting indirectly or directly with steam a carbonaceous feedstock comprises the steps of (a) passing a mixture of steam and the feedstock or a steam-reactive derivative thereof through at least one reaction zone and thereby producing at least one gas at a temperature of at least 350° C.;

(b) generating high pressure steam by heat exchange between water and at least one of the said gases and/or of a gas produced in converting such a feedstock to such a steam-reactive derivative;

(c) letting down the said steam in an expansion engine of the pass-out type;

(d) using the engine exhaust steam as part or all of the feed of at least one of the reaction zones of step (a); and is characterised by (i) bringing the engine exhaust steam into heat exchange with water whereby to produce a stream of hot water under pressure; and (ii) contacting the hot water with at least one of the gaseous or vaporised feeds to at least one of the reaction zones of step (a) whereby to provide at least part of the steam requirement of the said zone or zones.

The carbonaceous feedstock can be carbon monoxide or any one of natural gas, gaseous hydrocarbons, volatilisable hydrocarbons, non-volatilisable hydrocarbons and solid materials such as coal, coke, shale and waste materials.

By "direct reaction" with steam is meant a process in which the starting feedstock is converted to a gas by reaction with at least sufficient steam to complete the conversion to its equilibrium state. Direct reaction is practised using only the first 4 feedstocks mentioned.

By "indirect reaction" is meant the process sequence (such as those based on the gas recycle hydrogenator GRH or fluidised bed hydrogenator FBH) in which the feedstock is first either hydrogenated to hydrocarbons, especially methane, or else partially oxidised to produce a gas containing carbon monoxide; thereafter the hydrocarbon or carbon monoxide is reacted directly with steam. Such hydrocarbon or carbon monoxide is a "steam-reactive derivative" of the starting feedstock. The partial oxidation is commonly carried out in the presence of a small proportion of steam, too little to react with all the carbon monoxide formed. The indirect reaction with steam is less commonly practised for the gaseous or volatilisable hydrocarbons. The direct reaction of hydrocarbons usually produces a gas at or near chemical equilibrium at a temperature in the range 600°–1100° C., at which a considerable concentration of carbon monoxide, for example 10–40% v/v on a dry basis, is present. In order to increase the proportion of hydrogen this gas is subjected to the shift reaction, similarly to what is used if carbon monoxide is the starting material.

The direct reaction can be carried out in a single stage or a plurality of stages. The single stage can be for example A. externally heated "primary" catalytic reforming with steam and/or carbon dioxide, using catalyst in externally heated tubes or in adiabatic beds preceded by heat exchangers;

B. catalytic partial oxidation in the presence of at least stoichiometric steam in an adiabatic bed;

C. the shift reaction, when carbon monoxide is available as a starting feedstock.

Plural stage reaction can be for example

D. A operated so as to produce a gas containing 1–50 especially 2–25% v/v methane on a dry basis, and followed by B ("secondary reforming"), in which the methane content is decreased;

E. B operated in a first stage to produce a methane-containing gas and followed by a second state of B in which the methane content is decreased;

F. Adiabatic reaction with steam over a catalyst at an outlet temperature in the range 200°–650° C., especially 350°–550° C., of a vaporised hydrocarbon of higher molecular weight than methane, to give a gas containing suitably 30–70% of methane, on a dry basis, followed by any one of A, B and D, most conveniently A or D.

The reactants and conditions in step (a) are chosen according to the intended composition of the hydrogen-containing gas. Particular examples are:

ammonia synthesis gas:
D or E, with the partial oxidation stage fed with air, in order to introduce nitrogen, and followed by a shift stage;
A or B, followed by addition of nitrogen from an external source and including a shift stage;

methanol synthesis gas:
A without shift, using steam or steam+carbon dioxide;

D with the partial oxidation stage fed with oxygen, or with air if both ammonia and methanol are to be produced;
F with A as second stage.

high CO gas for various synthesis:
A without shift using steam + carbon dioxide;

hydrogen:
A or B with shift.

In more complicated plants more than one of such stages are operated in parallel and their product gases mixed.

When the direct reaction involves the reaction of a hydrocarbon over a catalyst, as in A, B, D, E or F, the hydrocarbon is usually and preferably desulphurised before the reaction, in order to avoid catalyst poisoning. As a result, the product gas can be passed to a shift stage, if required, without further purification. Cooling to shift inlet temperature can include a boiler raising high pressure steam as in step (b).

The indirect reaction via partial oxidation of non-volatilisable feedstocks to produce carbon monoxide necessarily includes a plurality of stages within step (a), but also includes the stages of
cooling and washing to remove ash, carbon and tar;
treating with an absorbent liquid to remove at least the bulk of the hydrogen sulphide and carbon oxysulphide present.

Such cooling can include a boiler raising high pressure steam as in step (b) for the engine of step (c). After such treatments steam has to be introduced for the shift stage, and according to the invention step (ii) this is done by contacting the treated gas with the hot water produced from the engine pass out steam.

In the indirect reaction via hydrogenation there are corresponding stages for removing gross contaminants and also a stage of fine desulphurisation before the hydrocarbons produced by hydrogenation are passed to the direct reaction using a catalyst. Again the temperature can be high enough to produce high pressure steam.

The hot gases produced in step (a) are one or more of the following:
raw process gas at a temperature in the range 600°–1100° C.;
shifted gas at a temperature in the range 350°–500° C.;
furnace flue gas at a temperature in the range 900°–1400° C.

From any one or more of these high pressure steam (40–200 bar abs.) is generated by heat exchange with boiler feed water. Other heat recoveries that may be operated include preheating reactants for the initial reaction of feedstock with steam or oxygen and superheating steam (which are high grade heat recoveries and are commonly used upstream of the high pressure steam boiler), and also boiler feed water heating, process air heating, furnace combustion air preheating and pressurised hot water heating.

The high pressure steam is generated more preferably at a pressure over 60, especially in the range 80–150 bar abs. The pressure to which such steam is let down in at least one expansion engine is preferably at or less than (preferably by up to 10 bar) the total pressure at the inlet of the stage at which it is to be used. If desired part of the effluent of such an engine can be let down further in one or more second engines exhausting at a still lower pressure or to a condenser. The exhaust of these second engines is preferably used in low grade heating duties. The shaft power generated by the engines, which are preferably turbines, can be used, directly or via an electric generator and electric motors, to drive machines forming part of the plant. Such machines include especially a gas compressor and/or circulator in a high pressure synthesis plant;
an air compressor in a plant involving partial oxidation by air or involving air liquefaction and separation;
a refrigerant compressor in the product separation section of an ammonia production process;
a furnace combustion air fan; and
smaller machines such as feed water pumps, $CO_2$-absorption liquor pumps and ammonia liquor pumps.

The engine effluent is brought preferably into direct heat exchange with water. This can be effected for example in a packed column or plate column or by simply injecting water into the flowing steam. The water preferably has been preheated, suitably to a temperature in the range 150° to 250° C., by heat exchange with one or more of the low grade heat sources in the plant for example gas streams at 150°–300° C. or effluent from a low pressure expansion engine.

The resulting hot water can be under a pressure sufficient to flow into contact with the gaseous or vaporised feed to at least one of the reaction stages of step (a) but, in the preferred process in which the steam is expanded to a pressure equal to or less than the reaction stage inlet pressure, it has to be pumped; such pumping of water, however, uses little power. The relevant feed to step (a) can be for example gaseous hydrocarbon, vaporised normally liquid hydrocarbon, methane-containing gas from a preceding stage of hydrocarbon hydrogenation or adiabatic hydrocarbon-steam reaction, carbon monoxide containing gas, carbon dioxide, air or oxygen. Most conveniently it is gaseous or vaporised hydrocarbon to be fed to stage A or stage B as defined above. The feed is preferably at a temperature in the range 20° to 200° C. before contact with the hot water. Contacting can be in for example a packed column or plate column or by spraying the hot water into the flowing feed.

The proportion of steam introduced by such contacting can be 100% of the requirement but is preferably up to 95% for example 30–90%, the remainder being direct steam, in order to facilitate control.

The process is especially advantageous when the pressure at the inlet of the zone or zones fed with a mixture including steam introduced by contacting with hot water is over 10 bar abs., especially in the range 30–150 bar abs. Pressures in that range are well established for non-catalytic partial oxidation processes and the ensuing shift process. It has been proposed in our European published application 993 to operate an endothermic catalytic steam hydrocarbon reforming process at pressures in the range 30–120, especially 40–80 atm. abs. Such a process is very suitably operated according to the invention, whether as part of an ammonia production process as in that application or for other uses.

The following description of shift and carbon oxides removal stages applies specifically to generating ammonia synthesis gas. In generating hydrogen the stages are substantially the same except that usually nitrogen is not present. In generating synthesis gases containing carbon oxides and hydrogen, shift and carbon dioxide removal are used only to the extent required in view of the carbon oxide to hydrogen ratio. In the important case of producing methanol synthesis gas by direct catalytic reaction of hydrocarbon boiling at up to 220° C. with steam, no shift or carbon dioxide-removal is needed. In each process sequence there is a stage of steam removal, which may be by indirect cooling and separation or, more preferably, by injection of water; the resulting warm water can be used as feed to step (i).

Since in step (ii) the steam is provided without boiling the water at a heating surface, the water need not be purified to the extent necessary for use in a boiler. Accordingly it can be process condensate from the above-mentioned steam removal or from a subsequent aqueous ammonia distillation or urea synthesis. Any ammonia, methanol, carbamate or urea in such water is decomposed in the chemical reaction steps after formation of the steam-containing mixture.

In a preferred ammonia production process based on a direct steam/hydrocarbon reaction over a catalyst with external heating as A above the pressure at the outlet of that catalyst is preferably in the range 30–120, especially 40–80 bar abs. and the temperature is in the range 750°–850° C. The steam ratio is preferably in the range 2.5–3.5 molecules of total steam per atom of carbon in the hydrocarbon if all the steam and hydrocarbon are fed to this stage. (This steam is fed mainly by contact with the hot water, according to the invention). The methane content of the product gas is typically in the range 10 to 20% by volume on a dry basis and this is preferred, although it is considerably higher than is normally thought suitable in the primary reformer gas of an ammonia synthesis plant. The catalyst is usually refractory-supported nickel.

The primary reformer gas leaving the catalyst may if desired be further heated and then enters the secondary reforming stage, which is a catalytic partial oxidation as B above, where it reacts with an oxygen-containing gas, which is preferably preheated to a temperature in the range 400°–700° C. Further steam can be fed to the secondary reformer or further hydrocarbon feedstock if it is desired to minimise the total steam ratio without having too low a primary reformer steam ratio. (This steam is preferably fed as superheated steam to avoid lowering the temperature). The outlet pressure is about the same as at the outlet of the primary reformer, apart from the pressure drop through the secondary reforming catalyst. The outlet temperature is preferably in the range 950°–1050° C. and the outlet methane content in the range 0.2 to 10% v/v on a dry basis. The proportion of air is preferably such to produce a gas containing 2.0 to 2.9 molecules of hydrogen equivalent (i.e. total of $H_2$ and CO) per molecule of nitrogen. The catalyst can be for example a supported nickel catalyst or chromium oxide catalyst or a combination thereof. The process in which there is used a quantity of air in excess of what would introduce 1 molecule of nitrogen per 3 molecules is preferably combined, as described in our European published application 993, with the subsequent feature of treating synthesis gas, after reaction to synthesis ammonia, to separate a stream enriched in hydrogen and returning the enriched stream to the synthesis.

By the above-mentioned heat recoveries the gas produced by preceding stages is cooled to a temperature in the range 300°–400° C., especially 320°–350° C., and then, if sufficiently pure, is passed to an iron-chrome shift catalyst. The reaction over the iron-chrome catalyst is exothermic (outlet temperature 400°–450° C.) and the outlet gas is again cooled with recovery of useful heat (including high pressure steam) in a similar manner to the cooling of process gas from earlier stages. It is then subjected to further shift reaction, preferably over a copper-containing catalyst, for which the inlet temperature is suitably 200°–240° C. and the outlet temperature 240°–270° C. Such a low-temperature shift stage produces a gas containing usually 0.1 to 0.6% v/v of carbon monoxide on a dry basis. When as is preferred, the pressure is higher than has been generally used in low temperature shift, the steam to dry gas ratio over the low temperature shift catalyst is kept down to a level that avoids damage to the catalyst, preferably in the range 0.1 to 0.3. This means that the steam to carbon ratio in any preceding steam/hydrocarbon reaction stages should not be too high, but it can be readily attained using ratios initially in the range 2.5 to 3.5 (methane feedstock) or 2.4 to 3.2 (feedstock of empirical formula $CH_2$) or in intermediate ranges for hydrocarbons of intermediate composition. The higher nitrogen content due to excess air helps to keep down the steam to dry gas ratio. If it is desired to use a higher steam to carbon ratio in preceding stages, or to add extra steam in shift stages, the steam to dry gas ratio can be kept down by recycling gas from positions downstream of carbon dioxide removal. Alternatively two or more high temperature shift stages separated by carbon dioxide removal can be used.

The outlet temperature of the low temperature shift stage is too low to produce high pressure steam, but useful heat can be recovered from the shifted gas in lower grade heat recoveries such as water heating for boiler feed or step (ii) and feedstock heating in series or parallel with the recoveries from the hotter gases already described and also such as carbon dioxide removal solution regeneration and aqueous ammonia distillation.

If the gas from the preceding stages contains sulphur it can be shifted non-catalytically or over a catalyst containing compounds of Group VI and Group VIII metals other than chromium and iron or containing alkali metal compounds of weak acids. Analogous heat recoveries are effected.

In producing pure hydrogen or ammonia synthesis gas, removal of carbon oxides is usually carried out in a first stage in which carbon dioxide is substantially removed, and a second in which carbon oxides removal is substantially complete such that catalysts such as ammonia synthesis catalyst are not significantly poisoned by them. If desired, carbon monoxide remaining after shift can be selectively oxidised to carbon dioxide, which is then removed along with carbon dioxide previously present. For the first removal stage the process gas is cooled, water is separated, suitably by direct contacting with added water to produce a feed for step (i), and then the first stage can be carried out using any liquid absorbent. Well-established chemical systems such as Benfield's potassium carbonate or diethanolamine potassium carbonate, "Vetrocoke", "Catacarb" or amine systems such as monoethanolamine can be used. These have, however, the disadvantage of consuming a substantial quantity of steam in the regeneration of the liquid absorbent, a requirement that is especially inconvenient when the steam to dry gas ratio of the shifted gas is at the preferred low levels. A 2-stage carbon dioxide removal, in the first stage of which most of the carbon dioxide is absorbed in an amine, such as triethanolamine, that is regenerable substantially without heating, and only in the second stage of which an absorbent is used that does require heat regeneration, is therefore preferable. The preferred high pressure makes possible the use of "physical" absorbents, the preferred examples of which can be regenerated merely by lowering pressure. Suitable absorbents used in industrially developed processes are tetramethylene sulfone ("Sulfinol"), propylene carbonate (Fluor), N-methyl-2-pyrrolidone ("Purisol"), methanol ("Rectisol") and the dimethyl ether of polyethyleneglycol ("Selexol").

If desired, part or all the carbon dioxide can be removed by absorption in anhydrous or aqueous ammonia. Such a procedure is especially useful if the ammonia is to be used for urea synthesis or for making ammonium sulphate by the calcium sulphate process. In a convenient form of the process, applicable especially when it is desired to operate at pressures less than optimal for using physical absorbents, the bulk of the carbon dioxide can be removed in a physical absorbent and the remainder in a chemical solvent as mentioned above or in ammonia. The latter procedure can be designed to suit any desired relative outputs of ammonia, carbon dioxide and urea.

The second stage of carbon oxides removal can be carried out by cryogenic separation or by contacting the gas with a carbon oxides absorbent such as copper liquor, but is most conveniently effected by catalytic methanation, for example over a supported nickel catalyst at an outlet temperature in the range 250°–400° C. This decreases the carbon oxides content to a few parts per million by volume but produces water, which can be removed by cooling, separation and passage over a water-absorbent such as alumina or a molecular sieve. The second stage can not be effected by means of liquid nitrogen washing, which can introduce nitrogen if required.

In a preferred ammonia production process according to the invention the dried gas contains nitrogen, hydrogen preferably in less than the stoichiometric ratio for ammonia synthesis, a small quantity of methane and fractional percentages of noble gases introduced with the secondary reformer air, and is thus ready for use as an ammonia synthesis gas. It may be compressed to any convenient synthesis pressure, but at the high pressure preferred for step (a) it is suitable for use in the synthesis with less than 50% compression and preferably no more than the increase in pressure (for example up to 20%) encountered in a synthesis gas circulator. If compression is used, it is preferably by up to 100 bar, conveniently in the range 20–80 bar, so that a single-barrel compressor-circulator can be used.

The "fresh" synthesis gas can be fed through a succession of catalytic stages and ammonia removal stages but, as in most ammonia synthesis processes, is preferably mixed with synthesis gas recycled from an ammonia removal stage. At the preferred synthesis pressures the attainable pass conversion over the synthesis catalyst is relatively low, giving an ammonia outlet concentration in the range 8 to 12% v/v. The ratio of recycled gas to fresh gas is suitable in the range 4 to 6.

The catalyst used in the ammonia synthesis can be of the usual composition, namely iron with promoting quantities of nonreducible oxides such as those of potassium, calcium, aluminium and others such as of beryllium, cerium or silicon. In order to afford maximum activity and thus to compensate for the lower rate of reaction due to low pressure, the iron catalyst preferably contains also cobalt, suitably to the extent of 1–20% w/w calculated as $Co_3O_4$ on the total oxidic composition from which the catalyst is made by reduction and in which the iron oxide is assumed to be all $Fe_3O_4$. The catalyst can be in the form of particles in the sieve range 18 to 4 ASTM (1–4.7 mm) especially 10 to 5 (2–4 mm), if it is desired to maximise their available contact surface or larger, for example up to 20 mm; the arrangement of the catalyst in the synthesis reactor preferably therefore may afford short gas flow paths, such as by radial or secantial flow in a cylindrical reactor. The outlet temperature of the synthesis catalyst is preferably in the range up to 500° C., especially 350°–430° C. This is lower than has been usual, in order to obtain a more favourable synthesis equilibrium. The catalyst volume is suitable in the range 100–200 m$^3$ per 100 metric tons per day output; this is higher than has been usual but can be tolerated because at the low operating temperature and pressure the reactor can be of simple construction for example of the hot-wall type.

Reacted gas can be cooled during, between stages of or after the synthesis, by any convenient means, but according to the invention the hot gas at some point is heat exchanged with high pressure steam generated by cooling furnace flue gas or step (a) process gas or high temperature shift outlet gas, or with intermediate pressure steam exhausted from a pass-out turbine or generated independently. Preferably the steam is heat exchanged with reacted synthesis gas leaving one, preferably the first, of a succession of catalyst beds, and preferably before the reacted gas has been cooled in any other heat exchange. The heat exchange with steam is preferably followed by heat exchange with feed water for the boilers of step (b) and these two heat exchangers are operated preferably so as to cool the reacted synthesis gas from one catalyst bed to the temperature at which they are to enter the next bed. After the gas has left all the catalyst beds or parts thereof it is cooled by heat exchange with incoming unreacted synthesis gas and with boiler feed water, each in one or more stages and in any convenient order, and then finally cooled to ammonia separation temperature.

The recovery of ammonia from reacted synthesis gas can be carried out by ordinary air-cooling or water-cooling if the pressure is high enough, but at preferred pressures in the range 40–80 bar. abs. is best carried out by absorption in water. Absorption in an acid or on a solid such as zinc chloride can be used if convenient. Absorption in water is conveniently carried out in two or more stages, for example in the first of which the gas contacts a relatively strong ammonia solution (for example 15 to 30% w/w) and in the last pure water or a weak ammonia solution (for example up to 10% w/w). After the absorption stage the gas is dried in order to prevent too-rapid deactivation of the catalyst by water. The aqueous ammonia product can be used as such or distilled to recover anhydrous ammonia from it.

When the fresh synthesis gas contains nitrogen in excess, noble gases and methane, continued removal of ammonia from it, especially in a recycle process, results in a substantial concentration of non-reacting gases. It is preferred to treat the gas mixture to keep the concentration of such gases below 10 especially below 5.0% v/v. This treatment could be applied to the fresh or mixed synthesis gas before entering the synthesis or to the whole of the reacted gas after removal of ammonia, but it is preferred to apply it only to a side stream, because then any failure of the treatment plant does not cause a shut-down of the whole production process. The side stream can conveniently be taken from the gas downstream of the ammonia separation and treated for hydrogen separation, whereafter the hydrogen is returned to the circulating synthesis gas. It could in principle be taken before ammonia separation but the treatment would then involve also a substantial ammonia recovery. The hydrogen separation treatment involves a pressure-drop and may involve also a pressure let-down through an expansion engine in order to decrease the gas temperature for cryogenic separation; consequently the hydrogen stream has to be compressed in order to return it to the synthesis. Preferably therefore the side stream is taken from the effluent of the circulator, where the gas pressure in the system is highest, and the separated hydrogen stream is returned to the inlet of the circulator, where the gas pressure is lowest. Part or all of the separated hydrogen stream can be recycled to the low temperature shift inlet.

The hydrogen separation treatment can be by any suitable means, for example by cryogenic fractionation, molecular sieve adsorption or palladium membrane diffusion.

The plant in which the process of the invention takes place is a new combination and constitutes a further feature of the invention.

The drawing, a flowsheet of one preferred form of the invention, shows the major chemical processing steps and heat exchanges in the synthesis gas generation section of an ammonia production process.

The process is based on steam-natural gas reforming. The reforming furnace has a radiative zone 10 and a convective zone 12. Zone 10 is heated by burners 14 fed with preheated natural gas from 16 and air fed in at 18 and preheated at 20 at the low temperature end of convective zone 12. The catalyst tubes 22 heated in radiative zone 10 are fed with a steam/natural gas mixture strongly preheated at 24 in the hottest part of convection zone 12. The mixture is formed in tower 128 from warm natural gas fed at 26 from a desulphurisation plant (not shown) and hot water fed over the packing of the tower at 130 and with the addition of a small quantity of steam at 132. The source of the hot water and steam will be described below. Gas leaving tube 22 consists of carbon oxides, hydrogen and methane. It is partly burnt with hot air supplied at 112 (from compressor 108 which has no final cooling stage and thus supplies hot air needing no preheating) at the inlet of secondary reformer 28 and then brought to equilibrium at a lower methane content over the secondary reformer catalyst. The gas leaving secondary reformer 28 is cooled in boiler 30 feeding high pressure steam drum 100, then cooled further in the heat exchanger 32 (a steam superheater feeding steam through line 34 to turbine 104) and boiler 36 also feeding steam drum 100. At the temperature of inlet to high temperature shift catalyst it now enters reactor 38 in which carbon monoxide reacts with steam to give carbon dioxide and hydrogen. This reaction is exothermic and the hot reacted gas is cooled in heat exchanger 40 (a boiler feeding steam drum 100) and 42 (a boiler feed water heater) to the inlet temperature of the low temperature shift catalyst. (The subsequent stages of low temperature shift, steam separation by direct or indirect heat exchange with water, carbon dioxide absorption, methanation and ammonia synthesis do not affect the principle of the invention and are not shown, except in so far as heat is derived from them in exchangers 80, 82 and 122).

The steam system that characterises the process according to the invention is based, in this preferred flowsheet, on common steam drum 100. Drum 100 is fed with treated boiler water heated in exchanger 82 by reacted ammonia synthesis gas that has been partly cooled in superheater 80 and is now led back to the synthesis through line 83: the feed to exchanger 82 is already warm as a result of low grade heat recoveries such as 42 and other positions not shown such as possibly after low temperature shift and in convective zone 12 of the steam reforming furnace. Water circulates from drum 100 through boilers 30, 36 and 40 already described. Steam passing overhead from drum 100 is superheated in heat exchanger 80 by reacted ammonia synthesis gas led in by line 81 from the synthesis catalyst, superheated further by hot raw synthesis gas at 32 and let-down in high pressure pass-out turbine 104 driving process air compressor 108, which supplies hot air to secondary reformer 28 at point 112. A small quantity of steam is exhausted at a pressure above the inlet pressure of reformer tube 22 and fed into the natural gas steam flow via valve 134 to be described. The main exhaust is at a pressure lower than the inlet of tube 22 and is divided into three part streams. The first feeds turbine 114, which drives alternator 116 supplying electricity to the small machines of the plant. The second part stream feeds turbine 118, which drives circulator 71 in the ammonia synthesis loop. (As a result of the high synthesis gas generation pressure there is no synthesis gas compressor). Turbines 114 and 118 are both of the pass-out type. Their exhaust steam is used in low-grade heating duties, principally the distillation of aqueous ammonia. In such duties it is condensed and may be recovered and used as boiler feed water (after de-aeration) or as warm water to be used in tower 120.

The third part stream is fed to packed tower 120. Here it flows upwards through the packing countercurrent to a flow of warm water fed in at 124. The water has been warmed at 122 in heat exchange with low temperature shift effluent gas fed in at 47. (As an alternative, heat exchanger 122 could be a packed tower in which warm water contacts such shift effluent gas directly and removes steam from it). Tower 120 includes an overhead valve for venting any gases introduced with the steam and water.

The bottoms liquid of tower 120 is hot water carrying the sensible heat of the warm water fed in at 124 and both the sensible and latent heat of the steam fed in from turbine 104. It is propelled by pump 126 into the top of packed tower 128 and therein flows downwardly countercurrent to a stream of warm desulphurised natural gas fed in at 26. Water in at 26. Water evaporates and the resulting saturated natural gas passes overhead to mixing point 132 where there is added a feed of steam under the control of valve 134. The proportion of stream added via valve 134 is typically 10% of the total requirement. The steam/natural gas mixture is now fed to preheater 24 and thence tube 22, as previously described. In tower 128 not all the water evaporates and the remaining liquid is recycled to tower 120 via heat exchanger 122.

In a typical process producing raw synthesis gas for ammonia or methanol synthesis, by endothermic steam reforming of natural gas (stage A above) at 21 bar abs. pressure, steam is generated at 60 bar abs. pressure and let down in an expansion engine. For an hourly output of 41.7 metric tons of ammonia the steam output is 248 metric tons per hour. This steam is let down in an expansion engine exhausting in part at 28, in part at 19.1 bar abs. The steam at 19.1 bar abs. at the rate of 29 te $h^{-1}$, is condensed into water in tower 120 to give 38850 kg mol h$^{-1}$ of water at 210° C. This water is contacted in tower 128 at 26.1 bar abs. with natural gas (3437.3 kg mol h$^{-1}$, initially at 100° C.) and produces a mixed gas stream containing 4481.7 kg mol h$^{-1}$ of steam, at a temperature of 197.9° C. The water discharged from tower 128 (34368.3 kg mol h$^{-1}$) is at 148.7° C. Inert gases (10.9 kg mol h$^{-1}$) are vented from the top of tower 120. Of the steam at 28 bar abs. leaving the engine, 49 te h$^{-1}$ are fed into the humidified natural gas stream at point 132. Thus 37.4% of the reactant steam is provided by steam at less than the reformer inlet pressure.

In a corresponding process in which all 78 te h$^{-1}$ of reactant steam are fed as steam at 28 bar abs. the steam generation rate has to be 250 te h$^{-1}$ and the energy input per te of ammonia produced is greater by 2.0 therms.

In processes in which the primary reformer pressure is higher, for example 40-80 bar abs., the energy saving due to the invention is substantially greater.

I claim:

1. A process for producing a hydrogen-containing gas by reacting indirectly or directly with steam a carbonaceous feedstock which comprises the steps of
    (a) passing a mixture of steam and the feedstock or a steam-reactive derivative thereof through at least one reaction zone and thereby producing at least one gas at a temperature of at least 350° C., said feedstock or steam-reactive derivative thereof being in gaseous or vaporized form;
    (b) generating high pressure steam by heat exchange between water and at least one of the said gases and/or of a gas produced in converting such a feedstock to such a steam-reactive derivative;
    (c) letting down the said high pressure steam in an expansion engine of the pass-out type;
    (d) using the engine exhaust steam as at least part of the steam feed to at least one of the reaction zones of step (a);
and is characterised by
    (i) bringing the engine exhaust steam into heat exchange with water whereby to produce a stream of hot water under pressure; and
    (ii) contacting the hot water with at least one of the said feedstock or steam reactive derivative thereof to be fed to at least one of the reaction zones of step (a) whereby to provide at least part of the steam requirement of the said zone or zones.

2. A process according to claim 1 in which in step (c) the pressure to which the steam is let down in at least one expansion engine is at or less than the total pressure at the inlet of the reaction zone of step (a) in which it is to be used, and the resulting engine exhaust steam is fed to the heat exchange in step (i).

3. A process according to claim 1 in which the heat exchange of steam with water in step (i) is direct.

4. A process according to claim 1 in which in step (ii) the hot water is contacted with a gaseous or vaporised hydrocarbon to be fed to a stage of externally heated catalytic reforming with steam and/or carbon dioxide or of catalytic partial oxidation in an adiabatic bed.

5. A process according to claim 1 in which 30-90% of the steam requirement of the said zone or zones is provided by contacting with hot water in step (ii).

6. A process according to claim 1 in which the pressure at the inlet of the said zone or zones fed with a mixture including steam introduced by contacting with hot water is in the range 30-120 bar abs.

7. In an ammonia production process which comprises
    (a) primary catalytically reforming at superatmospheric pressure a hydrocarbon feedstock with steam in at least one reaction zone to give a gas containing carbon oxides, hydrogen and methane;
    (b) secondary catalytically reforming the resulting primary reformer gas by introducing air and bringing the mixture towards equilibrium, whereby to produce a secondary reformer gas containing nitrogen, carbon oxides, hydrogen and a decreased quantity of methane;
    (c) converting carbon monoxide catalytically with steam to produce a shifted gas containing carbon dioxide and hydrogen; and
    (d) removing carbon oxides and steam from the shifted gas to give a nitrogen-hydrogen ammonia synthesis gas; and thereafter
    (e) reacting the synthesis gas to produce ammonia and recovering ammonia from the reacted gas;
    and in which energy is recovered by generating high pressure steam by heat exchange between water and at least one of the said gases containing carbon dioxide and/or flue gas from the furnace used in said primary reforming step, the temperature of such gas before such heat exchange being at least 350° C.;
    letting down the said high pressure steam in an expansion engine of the pass-out type, said engine powering a compressor compressing said synthesis gas preparatory to said synthesis; and
    using the engine exhaust steam as at least part of the steam feed to said primary reforming step;
    the steps of
    (i) bringing the engine exhaust steam into heat exchange with water whereby to produce a stream of hot water under pressure; and
    (ii) contacting the hot water with at least one of the gaseous or vaporised feeds to at least one of the reaction zones of step (a) whereby to provide at least part of the steam requirement of the said zone or zones.

8. A process according to claim 7 characterised further by operating said reforming conversion and carbon dioxide removal steps at a pressure in the range 40-80 bar abs. and increasing the pressure of the resulting ammonia synthesis gas by less than 50% before feeding it to ammonia synthesis.

* * * * *